United States Patent [19]

Futato

[11] Patent Number: 4,813,040
[45] Date of Patent: Mar. 14, 1989

[54] METHOD AND APPARATUS FOR TRANSMITTING DIGITAL DATA AND REAL-TIME DIGITALIZED VOICE INFORMATION OVER A COMMUNICATIONS CHANNEL

[76] Inventor: Steven P. Futato, 4016 Poplar St., Fairfax, Va. 22030

[21] Appl. No.: 925,172

[22] Filed: Oct. 31, 1986

[51] Int. Cl.$^4$ .................................................. H04J 3/17
[52] U.S. Cl. ................................. 370/111; 370/110.1
[58] Field of Search ....................... 370/110.1, 111, 80, 370/81

[56] References Cited

U.S. PATENT DOCUMENTS

| | | | |
|---|---|---|---|
| 3,304,372 | 2/1967 | Filipowsky et al. | 370/111 |
| 3,310,631 | 3/1967 | Brown | 370/111 |
| 3,668,645 | 6/1972 | Reymond et al. | 370/111 |
| 4,528,659 | 7/1985 | Jones | 370/80 |

FOREIGN PATENT DOCUMENTS 0021145  1/1981  European Pat. Off. ............ 370/111

*Primary Examiner*—Douglas W. Olms
*Attorney, Agent, or Firm*—Birch, Stewart, Kolasch & Birch

[57] ABSTRACT

A system and method transmits digitalized voice and data over a communications channel as a combined data stream while transmitting the digitalized voice in substantially real-time. The system makes use of a redundancy in the coding used to represent at least one amplitude level in the digitalized voice by using one of the redundant codings as a signalling code in a signalling time frame to signal the presence of data and by converting a digitalized voice codeword having this redundant code to its duplicate code. In this manner, during silence periods of the voice communication on the communications channel, data may be inserted. The system and method allow digital data to be transmitted without any limitation on its bit density. As the communications channel normally has a bit density requirement requiring at least a certain density of digital ones, the system of the present invention monitors the digitalized data to determine when the number of consecutive zeros exceeds a predetermined number and inserts a one into the data stream to insure that bit density requirements are not violated. The receiver tests for the signalling code indicative of the presence of data and based on this code, transmits the data and voice to their respective proper locations at the downstream end of the communications channel. Later, the receiver removes any inserted ones from the digital data stream to recover the digital data.

13 Claims, 7 Drawing Sheets

| INPUT CODING RANGE | PCM VOICE CODE WORD | DECODER OUTPUT LEVEL |
|---|---|---|
| $X_{127}, X_{128}$ | 10000000 | $Y_{127}$ |
| $X_{126}, X_{127}$ | 10000001 | $Y_{126}$ |
| ... | | |
| $X_n, X_{n+1}$ | (255-12) MODULO 2 | $Y_n$ |
| ... | | |
| $X_3, X_4$ | 11111100 | $Y_3$ |
| $X_2, X_3$ | 11111101 | $Y_2$ |
| $X_1, X_2$ | 11111110 | $Y_1$ |
| $X_0, X_1$ | 11111111 | $Y_0$ |
| $X_0, -X_1$ | 01111111 | $Y_0$ |
| $-X_1, -X_2$ | 01111110 | $-Y_1$ |
| $-X_2, -X_3$ | 01111101 | $-Y_2$ |
| $-X_3, -X_4$ | 01111100 | $-Y_3$ |
| ... | | |
| $-X_n, -X_{n+1}$ | (127-n) MODULO 2 | $-Y_n$ |
| ... | | |
| $-X_{125}, -X_{126}$ | 00000010 | $-Y_{125}$ |
| $-X_{126}, -X_{127}$ | 00000001 | $-Y_{126}$ |
| $-X_{127}, -X_{128}$ | 00000010 | $-Y_{125}$ |

METHOD AND APPARATUS FOR TRANSMITTING DIGITAL DATA AND REAL-TIME DIGITALIZED VOICE INFORMATION OVER A COMMUNICATIONS CHANNEL

FIELD OF THE INVENTION

This invention relates to communications systems and more particularly to a communication system capable of carrying data during idle intervals on communications circuits also carrying pulse code modulated (PCM) voice conversations.

BACKGROUND OF THE INVENTION

It is well known that communications circuits carrying voice conversations are idle over significant periods of time. On a typical telephone circuit, each call in progress occupies a full-duplex trunk circuit. Each such circuit is dedicated to the conversation during the entire duration of the call, yet typically each party is active (i.e., speaking) only about half of the time. Thus, on the average at least half of the transmission capacity in a telephone circuit typically is idle. Furthermore, when such communications circuits form part of a telephone switching network, additional periods exist in which the communications circuits are unassigned to voice conversations and are idle. The cumulative effect of these factors is that 65 percent or more of the transmission capacity in voice communications networks is wasted.

The prior art contains examples of systems which exploit this phenomenon to allow sharing of a communications circuit between voice conversations and non-real-time data transmission. In general, these systems comprise a means for monitoring, by the transmitting apparatus, voice activity on the communications circuit and for detecting when voice activity drops below a preset threshold; the transmitting apparatus further switching between the transmission of voice information and data information; and sending a signal to the receiving apparatus to commence receiving data transmissions. Such devices send a signal from the transmitting apparatus to the receiving apparatus to resume receiving voice transmissions when voice activity resumes at the transmitting apparatus; and the switching between the receiving of voice information and data information is reinstated by the receiving apparatus in response to this signal. A key problem to be solved by any such system is in signalling between the transmitting apparatus and receiving apparatus to allow the proper separation of voice information and data information by the receiving apparatus. In a practical system, the signalling method must be immune to false signalling due to noise on the transmission line; it must not add unduly to the overhead (i.e., non-end user information) that must be transmitted; and must not impose restrictions on the allowable information content of either the voice information or data information to be carried on the shared circuit.

One early method reserved one bit in each PCM code word for signalling. A "zero" in this bit position indicated one type of information, for example voice information, was contained in the remaining bit positions of the code word, while a "one" indicated the other information type. This method, while effective, reduces the number of voice quantizing levels which can be represented by a voice codeword of given length, resulting in a reduction in quality of the circuit for carrying voice conversations.

Other systems in the prior art have improved on this by inserting special signalling characters onto the communications circuit to indicate changes from voice to data transmission of the transmitting apparatus, and vice versa. While such a system markedly improves the quality of the circuit by allowing all bits to be used for carrying quantization level information, it has the drawback that the signalling characters cannot be contained in the voice and data information since this would falsely signal the receiving apparatus to change from voice to data reception, or vice versa. Such an occurrence would cause the receiving apparatus erroneously to interpret data information as voice information and vice versa, thereby intermixing the two separate forms of information.

This problem has been solved in the past by prohibiting the signalling characters from appearing in the digitalized voice information or in the data information entered into the system by the end user. From the viewpoint of the end user, the communications circuit is no longer transparent for a selected application, because the user is prevented from placing the signalling characters in the voice information or data information to be carried by the circuit. This method was acceptable in older data systems, intended primarily for the transmission of teletype and telegraph signals based on predefined and well-structured coding schemes, which inherently contained a number of reserved signalling characters. However, it is not practical for use with more modern computer and data systems, which generally will transmit arbitrary, unrestricted data information occasionally containing the signalling characters. For voice, this method removes at least one quantization level from use for digitizing voice, resulting in a slight reduction in quality of voice conversations carried on the circuit.

An additional difficulty with such a method is that it is susceptible to false signalling caused by noise in the communications circuit. Errors thus induced can with some probability corrupt a genuine signalling character, destroying its appearance as a signalling character and causing it to be interpreted by the receiving apparatus as either voice information or data information. This causes the transmitting apparatus and receiving apparatus to enter different states, so that voice information is erroneously interpreted to be data information by the receiving apparatus, and vice versa. Similarly, voice information or data information may be corrupted by errors on the communications circuit in such a way that a signalling character is falsely created when none was sent by the transmitting apparatus, again causing the transmitting apparatus and receiving apparatus to enter different states.

SUMMARY AND OBJECTS OF THE INVENTION

Accordingly, the present invention is directed to a system for carrying near-real-time data information on communications circuits also carrying pulse-code modulated (PCM) voice information with the data information being transmitted during idle periods of voice activity. This invention is particularly adapted for use on full-duplex communications circuits, which are the type primarily used for carrying voice information by telephone networks, but it is recognized that this invention may also apply to communications circuits of the half-duplex and simplex types as well. Furthermore, this invention contemplates use both on communications circuits capable of carrying only a single voice conversation at a time, as well as on high-speed communications circuits capable of carrying multiple voice conversations simultaneously as a multi-circuit group. A common example of a multi-circuit PCM group to which this invention applies, but is not limited to, is the T1 digital carrier system, which is well known to those skilled in the art.

Accordingly, it is an object of this invention to time-multiplex voice and data information over a communications circuit or multi-circuit group, utilizing the idle periods in the voice conversations for transmitting data information.

In voice conversations, excessive delays in transmission or momentary interruptions in the channel which exceed a certain maximum are perceptible by the listener, and are judged to be degradations of the quality of the communications circuit. This is not the case with most data transmissions, where brief transmission delays are tolerable. Thus, the real-time nature of the voice information must be preserved by the communications circuit. Accordingly, it is a further object of this invention to give priority to the voice information on the communications circuit and to utilize the communications circuit for data transmission in such a way that the effect on the voice information is minimal.

It is yet another object of this invention to incorporate a means of signalling changes of state on a communications circuit, from voice information to data information and vice versa, which is efficient, that is, which results in a minimal amount of signalling bits in relation to the usable information capacity of the communications circuit.

It is another object of this invention to provide a means of signalling changes of state which is minimally sensitive to errors induced in transmission. It is the intent of the signalling method to recover rapidly from errors which may be induced, so that there is minimal perceptible degradation of the voice information and low probability of undetected and non-recovered errors occurring in data information.

It is a further object of this invention to provide a means of signalling which preserves the transparency of the communications circuit to the voice and data information carried by the communications circuit. That is, the signalling method incorporated within this invention allows arbitrary data information to be carried without inducing false signalling, and also without reducing the number of quantization levels allowed in digitizing the voice information.

Certain types of digital transmission lines synchronize clocking circuitry at the receiving apparatus with the transmitting apparatus by deriving timing information from the stream of information bits present on the digital transmission line. The most widely used example of this technique is the T1 transmission system. Because timing information is only carried by "ones" pulses in the bit steam (since "zeros" are transmitted as a constant voltage level), the presence of long series of consecutive "zeros" in the bit stream or an insufficient average density of "ones" in the bit stream results in loss of synchronization and must be prevented. Since arbitrary streams of data information may contain a high frequency of "zeros", the usual approach is to reserve one bit position in each eight-bit time slot for timing, and to fill this position with a "one". Only seven user data bits may thus be transmitted in each time slot, reducing the efficiency of the link by approximately 12.5 percent. It is an object of this invention to improve the efficiency of the link for arbitrary input data by allowing up to all eight bits in each transmitted time slot to carry data information, while still ensuring a sufficient frequency of "ones" to allow for proper synchronization.

In multiplexed voice PCM systems in which a multi-circuit group is carried over a single high-speed transmission line, the digital bandwidth of the transmission line is broken down into channels, each of which corresponds in bandwidth to the bandwidth of an individual communications circuit capable of carrying one PCM voice conversation, and hereinafter referred to as a "voice-grade channel." In established practice, this channelization constrains the assignment of channels for carrying data information. This is a result of the fact that, in usual multiplexer systems intended to operate with voice circuits, circuits carrying data information at a digital rate below the digital rate of the channel which corresponds to a single voice circuit must be arranged within the channelization structure in such a way that the data circuit is derived entirely from one voice-grade channel, and may not be derived from portions of two different voice-grade channels. However, this is wasteful of the bandwidth of the transmission line, since digital rates of commonly used data circuits are not integral submultiples of the digital rate of the standard PCM voice-grade channel. For example, five data circuits operating at 9600 bits per second will fit into the 56,000 bit per second digital bandwidth of a PCM voice-grade channel, with a remainder of 8000 bits per second not usable. Two PCM voice-grade channels still only support ten such data circuits, even though the aggregate remainder of 16,000 bits per second is sufficient to provide another 9600 bit per second data circuit, because the two separate remainders lie in different voice-grade channels and cannot be combined. Accordingly, it is an object of this invention to provide a more efficient means of providing data channels by eliminating the constraining effect of the channel boundaries of the voice-grade channels.

BRIEF DESCRIPTION OF THE DRAWINGS

These and other objects and features of the invention will become apparent from the more detailed description which follows and wherein.

DETAILED DESCRIPTION OF THE PREFERRED EMBODIMENT

Figure 1:
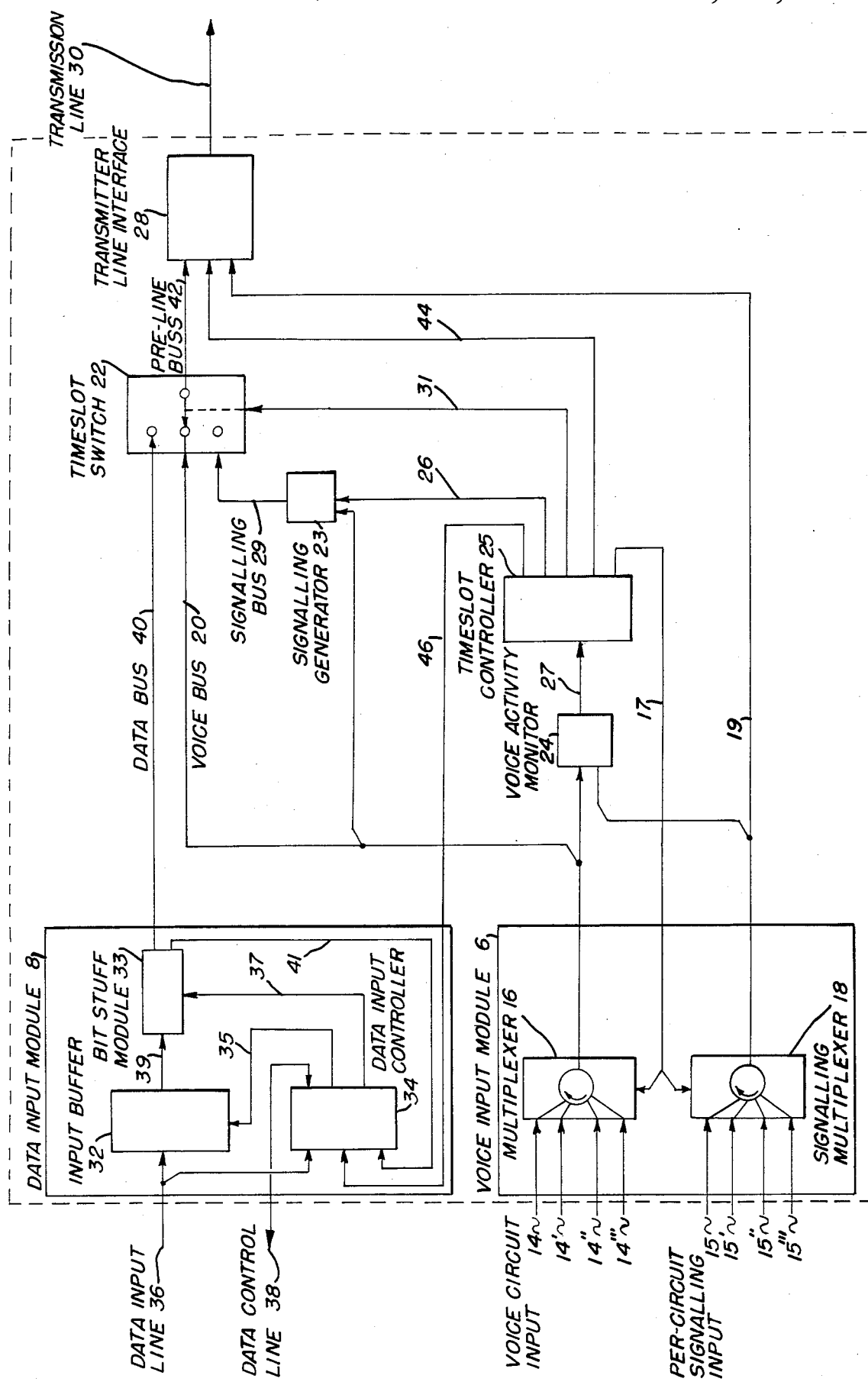
FIG. 1 is a block diagram illustrating a transmitter used in the system of a preferred embodiment of the present invention.
Figure 2:
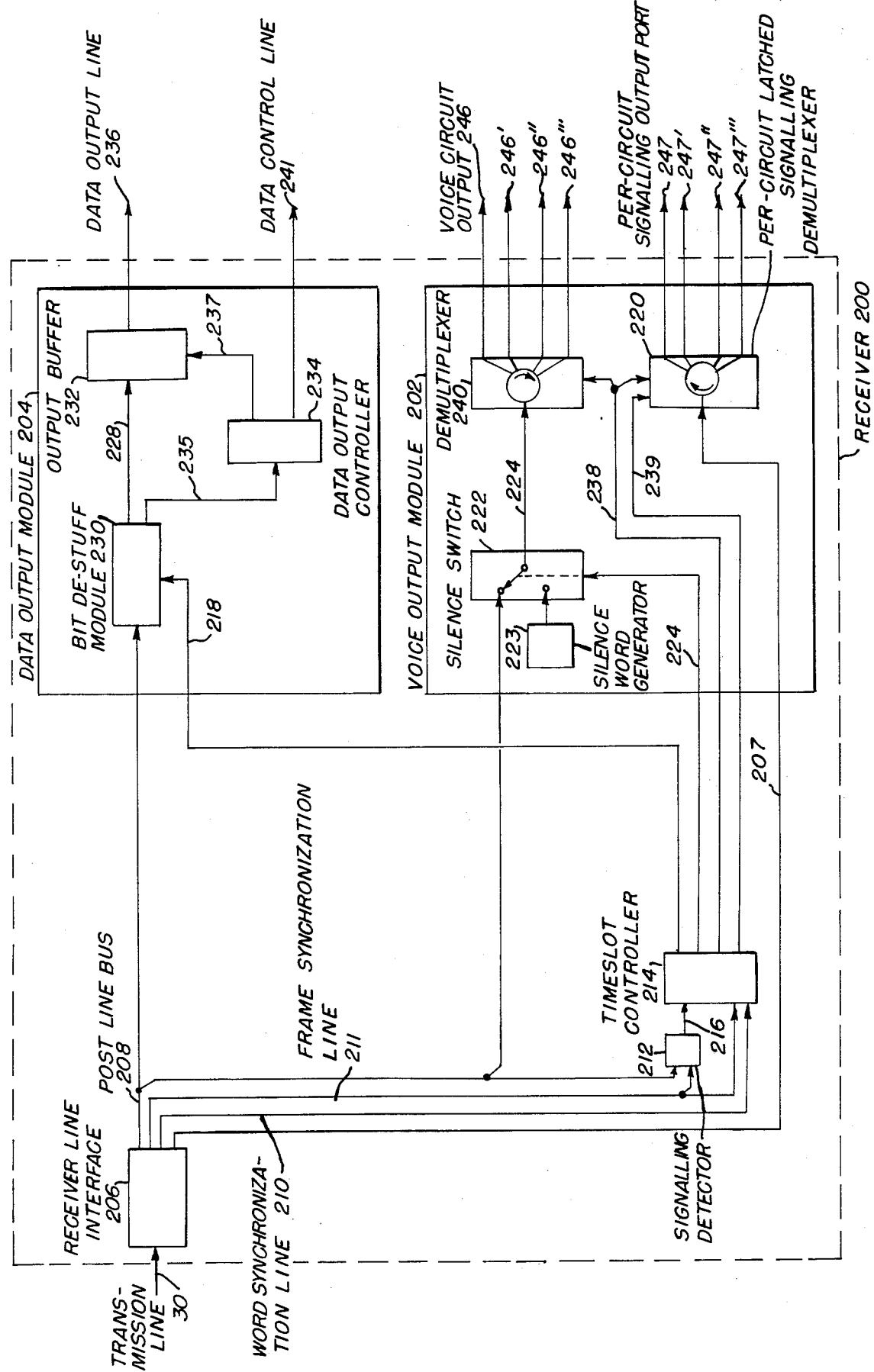
FIG. 2 is a block diagram illustrating a receiver used in the system of a preferred embodiment of the present invention in conjunction with the transmitter of FIG. 1.

FIGS. 1 and 2 depict the overall block diagram of equipment which embodies the invention. A complete system for the one-way transmission of information comprises a transmitter (generally indicated as 10) which drives a transmission line 30, which in turn connects to a receiver (generally indicated as 200). To permit simultaneous two-way transmission of information, which would be the normal method of operation, a duplicate arrangement would be used to provide communication in the reverse direction in a full duplex arrangement.

The transmitter 10 includes a voice input module 6 whose general purpose is to assemble digital voice information from multiple external sources into a composite time-division multiplexed (TDM) format; a data input module 8, operating in parallel with the voice input module 6, whose general purpose is to accept digital data information from an external source and assemble it into a format suitable for transmission on transmission line 30 and subsequent reception by receiver 200. A timeslot switch 22 selects, at appropriate instants of time, digital voice information from either voice input module 6, data information from data input module 8, or signalling information from a signalling generator 23, and applies the selected signal to the input of a transmitter line interface 28 via a pre-line bus 42. The timeslot switch always selects the signalling generator 23 during the first timeslot of a superframe for each voice channel. Transmitter line interface 28 provides an electrical interface having characteristics suitable to drive transmission line 30. A voice activity monitor 24 connects to the outputs of voice input module 6 and detects idle periods within each individual voice channel. Specifically, voice activity monitor 6 connects to voice bus 20 to detect periods of inactivity in the voice signal within each individual voice channel, and it also connects to line 19 to detect changes in per-channel signalling states (to be later described). A timeslot controller 25 receives indications of the presence of idle periods from the voice activity monitor 24 via a line 27 and then causes timeslot switch 22 to select either a voice information codeword from voice bus 20, a data information codeword from data bus 40, or a signalling codeword from signalling bus 29, in order to apply the selected codeword to transmitter line interface 28 via pre-line bus 42. Input of voice information is made via voice circuit inputs 14, where each voice circuit input 14 is able to input one voice circuit containing one voice conversation in PCM format. Input of per-channel signalling information is made via per-channel signalling inputs 15, where each per-channel signalling input 15 is able to input signalling information related to one voice circuit input 14. Input of data information is made via data input line 36.

The data input module 8 contains an input buffer 32, a data input controller 34, and a bit stuff module 33, whose combined purpose is to receive digital data signals from end user data equipment such as computers, data terminals, or other data communication equipment connected to data input line 36, and to convert these digital data signals to a format suitable for transmission on transmission line 30 and subsequent reception by receiver 200. Specifically, input buffer 32 functions as a first-in, first-out (FIFO) memory whose purpose is to smooth out short-term variations in the rate of transfer of data codewords on transmission line 30, which occur due to statistical fluctuations in voice activity on the voice channel inputs 14. Input buffer 32 thus permits data input line 36 to operate at a constant rate of data transfer, regardless of short-term variations in data transfer rate within the system.

Data codewords which are read out of the input buffer 32 are passed via line 39 to the bit stuff module 33, whose purpose is to detect the presence of extended sequences of "zeros" which may from time to time occur in the data stream appearing on data input line 36 (hereinafter referred to as the "user data stream"). Upon detecting such a sequence of "zeros", bit stuff module 33 stuffs a "one" bit in a prescribed manner, which will be described in detail below, to ensure that a certain minimum quantity of "ones" appear on transmission line 30.

Data input controller 34 controls the operation of the input buffer 32 and the bit stuff module 33. The data input controller 34, via line 35, controls the writing of data codewords from data input line 36 into specific memory locations of input buffer 32 and the reading of data codewords from specific memory locations of input buffer 32 to effect FIFO operation. The data input controller 34 also provides such other control functions as are necessary to effect FIFO operation of input buffer 32, as will become clear below. The data input controller 34 coordinates, via line 37 and line 41, the operation of bit stuff module 33 and also accepts control commands from timeslot controller 25 via line 46 which indicate that the next data codeword is to be made ready by the data input module 8 and placed onto data bus 40; and further sends and receives such other control signals via data control line 38 as may be needed to coordinate operation with specific end user data equipment. An example of a control signal on data control line 38 would be a clock input or output signal to synchronize the rate at which data codewords are read into input buffer 32 with the rate of operation of end user data equipment attached to data input line 36.

Voice input module 6 contains a multiplexer 16 which combines a quantity of individual digitalized voice circuit inputs 14 into a single composite time-division multiplexed (TDM) signal, which is output onto voice bus 20. Each voice circuit input 14 inputs a digitalized representation of an analog voice waveform which has been digitalized using North American standard mu-law coding. Methods and circuits for effecting the digitalizing, as well as for time-division multiplexing of such digital signals, are well known to those skilled in the art and are thus not further discussed in the present application. In addition, in parallel with each voice circuit input 14 is a corresponding per-circuit signalling input 15 which is used to enter per-circuit voice signalling bits (so-called A and B signalling bits) used within the North American standard T1 format. These are used to convey information between the circuit end points about the status of the circuit and equipment attached to it (such as telephones or switching equipment). Per-circuit voice signalling bits are time multiplexed by signalling multiplexer 18 and placed on line 19. Signalling multiplexer 18 and multiplexer 16 are synchronized by timeslot controller 25 via line 17, so that line 19 will contain the per-circuit voice signalling bits corresponding to a voice circuit 14, 14', 14", etc., whenever the voice codeword for the corresponding voice circuit is contained on voice bus 20. The per-circuit voice signalling bits are read by transmitter line interface 28 and combined with the pre-line signal at specific instants of time, in accordance with the North American standard T1 format.

The composite TDM signal from the output of multiplexer 16 is applied to voice bus 20, whose purpose is to carry the composite TDM signal to timeslot switch 22, signalling generator 23, and voice activity monitor 24. The voice activity monitor 24 monitors the activity of each conversation carried in the composite TDM signal on voice bus 20 for the purpose of detecting idle periods in the conversations carried on the individual channels which comprise the composite TDM signal. Voice activity monitor 24 also monitors the per-circuit signalling bits via line 19 for the purpose of detecting changes in signalling states which are required to be transmitted to the receiving apparatus. The presence of active periods in the conversations on the channels or changes of signalling states are communicated via line 27 to timeslot controller 25, which provides the master control of other portions of the transmitter 10. Based on the determination of whether a given channel is actively carrying voice or is idle, and whether signalling information is to be transmitted to the receiving apparatus, the timeslot controller 25 outputs signals via control line 31 which govern the connections of timeslot switch 22.

Figure 7:
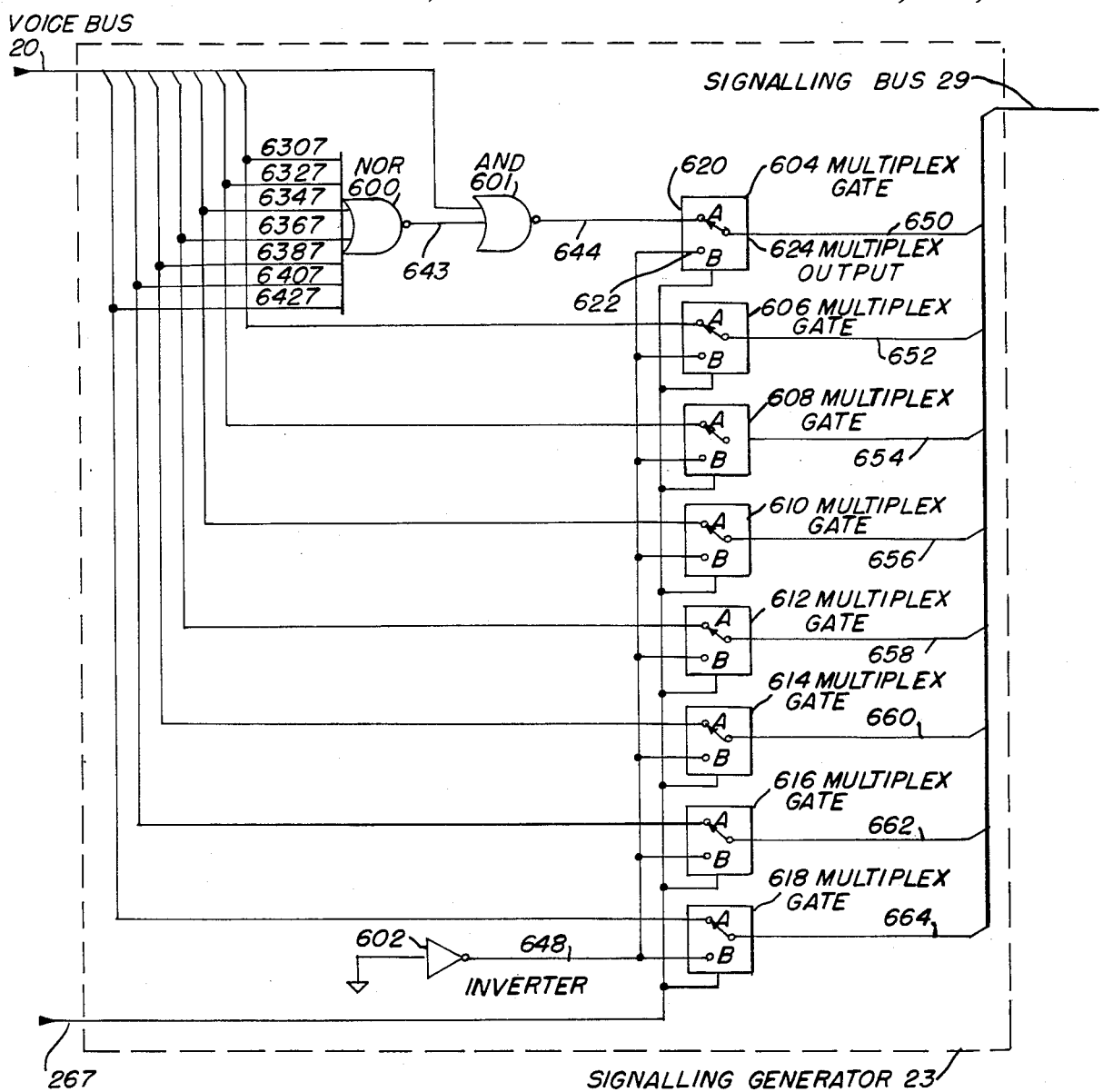
FIG. 7 is a schematic diagram illustrating the detail of the signalling generator 23 illustrated in FIG. 1.

Signalling generator 23 generates signalling codewords which conform with the specific signalling technique disclosed in detail below and is an important feature of the present application. The specific signalling codewords generated at each instant of time are controlled by signals from timeslot controller 25 via line 26, as will become clear. The detailed operation of signalling generator 23 is depicted in FIG. 7. Voice codewords enter signalling generator 23 via voice bus 20, which is composed of eight individual signal lines 628, 630, 632, 634, 636, 638, 640, and 642, which carry bit 1, bit 2, bit 3, bit 4, bit 5, bit 6, bit 7, and bit 8 of the voice codeword, respectively. Lines 630, 632, 634, 636, 638, 640, and 642 are inputs to "NOR" gate 600, whose function is to output a "zero" signal onto line 643 whenever all inputs are "one", and a "one" signal whenever at least one of its inputs is a "zero". The output line 643 from NOR gate 600 is applied to a first input of an AND gate 601. A second input of this AND gate 601 receives the bit 1 code signal from line 628. This arrangement effects the substitution of a "zero" into bit position one of the voice codeword when and only when each bit position of the voice codeword contains a "one", in accordance with the specific signalling technique disclosed below. Line 644 is connected to "A" input 620 of Multiplex gate 604. The function of Multiplex gate 604 is to cause the signal present at "A" input 620 to be directed to the multiplex output 624 when select line 26 is at low-signal level, and conversely to cause the signal present at "B" input 622 to be directed to the multiplex output 624 when select line 26 is at high-signal level. Multiplex gates 606, 608, 610, 612, 614, 616, and 618 function in similar fashion, with lines 630, 632, 634, 636, 638, 640, and 642 being connected to the "A" input of each multiplex gate, respectively. The "B" input of each multiplex gates 604, 606, 608, 610, 612, 614, 616, and 618 is connected to inverter 602 via line 648. The input of inverter 602 is forced to a "zero" level by connecting to signal ground or by other suitable means, thereby forcing the output of inverter 602 to contain a "one", which will also thereby drive the "B input of the respective multiplex gates to contain a "one". The multiplex outputs of multiplex gates 604, 606, 608, 610, 612, 614, 616, and 618 are connected to lines 650, 652, 654, 656, 658, 660, 662, and 664, respectively, which together comprise signalling bus 29. In operation, timeslot controller 25 causes, by applying a high-signal level to line 26, signalling bus 29 to contain the signalling codeword which signifies data (specifically, a codeword containing a "one" in all bit positions) by causing all multiplex gates to select their respective "B" inputs. Similarly, timeslot controller 25 causes, by applying a low-signal level to line 26, signalling bus 29 to contain the signalling codeword which signifies voice (specifically, a codeword containing a "zero" in at least one of its bit positions) by causing all multiplex gates to select their respective "A" inputs. If all bits of the codeword are not ones, the codeword will be passed through the signalling generator 23 and unaltered when the multiplexer gates are set to their respective "A" inputs. However, if all bits of the codeword received on voice bus 20 are ones indicating a zero amplitude, then the signalling generator substitutes a "0" for a "1" in the first bit position to develop a second (alternate) code word indicating a zero analog amplitude.

The function of timeslot switch 22 is to convey a codeword from one of its three inputs (viz., voice bus 20, data bus 40, and signalling bus 29) to pre-line bus 42. During each timeslot, timeslot controller 25 selects exactly one of the three codeword types and communicates this selection to timeslot switch 22 via line 31, causing the corresponding codeword to be placed on pre-line bus 42. During timeslots corresponding to active periods in the conversations on the voice channels, voice bus 20 will be selected and a voice codeword will be conveyed to pre-line bus 42. During timeslots corresponding to idle periods in channels of the composite signal, data bus 40 will be selected and a data codeword will be conveyed to pre-line bus 42. During timeslots which are signalling timeslots (these are the first timeslot for each voice channel during each superframe), signalling bus 29 be selected and a signalling codeword from signalling generator 23 will be conveyed to pre-line bus 42. The composition of the signalling codeword and its placement within the overall line signal are in accordance with the specific signalling technique disclosed in detail below.

Pre-line bus 42 contains the pre-line signal, which is the time-division multiplexed composite of voice, data and signalling codewords formatted in accordance with the frame structure disclosed hereinbelow. The pre-line signal is input to transmitter line interface 28, which provides the electrical characteristics required to drive transmission line 30. Transmitter line interface 28 converts from the bit-parallel format of pre-line bus 42 to bit-serial format which would commonly be employed on transmission line 30. In addition, transmitter line interface 28 inserts line framing and synchronization bits as may be needed to ensure proper operation of the receiving apparatus at the distant end of transmission line 30, in accordance with the transmission line protocol in use. In the preferred embodiment which uses North American Standard T1 format, framing and synchronization bits are inserted after every 192nd information bit. An additional function is the combining of per-channel voice signalling bits contained on line 19 with voice codewords contained on pre-line bus 42 during timeslots on transmission line 30 designated to carry per-channel voice signalling bits (for example, during the sixth and twelfth frames in North American Standard D4 format) which are not carrying data codewords or signalling codewords. That is, per-channel voice signalling bits are only combined with voice codewords, but data codewords and signalling codewords are never modified by the per-channel voice signalling bits. Insertion of framing and synchronizing bits, and combining of per-channel voice signalling bits with voice codewords, is synchronized and controlled by timeslot controller 25 via line 44. The composite signal appearing on transmission line 30, composed of the pre-line signal into which framing and synchronization bits and per-channel voice signalling bits have been inserted, is referred to as the line signal. At receiver 200 the line framing and synchronization bits are removed, as will be described below, forming at the receiver the post-line signal. Note that the post-line signal in the receiver 200 is an identical copy of the pre-line signal in transmitter 10, assuming that no bit errors have occurred during transmission over transmission line 30.

The receiver 200 is composed of a receiver line interface 206 whose purpose is to provide an electrical interface of characteristics suitable for the reception of the line signals from transmission line 30; a signalling detector 212, whose purpose is to detect and interpret signalling information within the post-line signal contained on post-line bus 208 during the first timeslot of each superframe for each voice channel in order to delineate the positions of voice and data codewords within the post-line signal; a timeslot controller 214 whose purpose is to receive indications from signalling detector 212 via line 216 of the positions of voice and data codewords within the post-line signal and to control the operation of other components of the receiver 200 in accordance with these indications; a voice output module 202 whose general purpose is to receive the voice codewords which appear within the post-line signal contained on post-line bus 208, and distribute the voice codewords to the proper voice circuit output 246; and a data output module 204 whose general purpose is to receive data codewords from the post-line signal contained on post-line bus 208 and convert them into a format suitable for use by external end user data equipment, which would be connected to data output line 236. The operation of these major components is summarized in the following paragraphs.

Transmission line 30 connects to receiver line interface 206, whose purpose is to provide proper reception of the line signal appearing at its input. Receiver line interface 206 converts these line signals from the format of transmission line 30 to a format more suitable for use by the internal digital circuitry of receiver 200. An example of this would be converting the bipolar, positive-and-negative three volt return-to-zero electrical format of a transmission line 30 employing North American T1 format to positive five volt unipolar format commonly used by digital logic circuitry. Receiver line interface 206 thus detects and converts codewords from bit-serial format of transmission line 30 to bit-parallel format employed on post-line bus 208, and places these on post-line bus 208 for delivery to subsequent circuitry, as will be made clear below. Additionally, receiver line interface 206 detects the per-circuit voice signalling bits added at transmitter line interface 28, and places these on line 27 for subsequent delivery to voice output module 202. Additional functions of receiver line interface 206 are the recovery of clock and the derivation of framing and synchronization information from the line signal. The clock may be recovered by a ringing tank circuit, phase-locked loop circuit, or the like as would be known to those skilled in the art. Framing and synchronization is achieved by inspecting the framing and synchronizing bits in the line signal which were added by transmitter line interface 28 in accordance with well-known techniques. This operation allows receiver line interface 206 to recover the positions of specific channels within the composite TDM signal. Receiver line interface 206 removes the framing and synchronization bits from the line signal to form the post-line signal, which is placed on post-line bus 208.

Framing and synchronization information is communicated from receiver line interface 206 to timeslot controller 214 via word synchronization line 210 and to signalling detector 212 and timeslot controller 214 via frame synchronization line 211. Word synchronization line 210 signals to timeslot controller 214 the start of reception of each new codeword, allowing the serially-transmitted line signal to be properly separated into its constituent codewords. Frame synchronization line 211 signals to timeslot controller 214 and signalling detector 212 the start of each new superframe, allowing the proper separation of signalling information within the post-line signal in accordance with the specific signalling technique disclosed in detail below.

Signalling detector 212 monitors the line bus 208 for the purpose of detecting and interpreting signalling codewords appearing within the post-line signal. Frame synchronization line 211 forms a second input to signalling detector 212, for the purpose of synchronizing signalling detector 212 to the overall frame and superframe structure employed. This feature enables signalling detector 212 to lock onto the signalling codewords, which are contained in specific locations within the overall frame and superframe structure. The specific technique by which signalling codewords are located within the pre-line and post-line signals is disclosed in detail below.

Signalling detector 212 monitors the first timeslot of each voice channel and communicates to the timeslot controller 214 via line 216 a mapping of the positions of voice and data codewords contained in the post-line signal. This operation enables timeslot controller 214 to perform its primary function, which is to control the operation of data output module 204 and voice output module 202 to ensure that voice and data codewords are routed from post-line bus 208 to the proper voice channel output 246 or data output line 236. The specific functions of timeslot controller 214 will be clarified hereinbelow.

Turning to the data output module 204, the post-line bus 208 connects to a bit de-stuff module 230, whose purpose is to detect and remove "ones" stuff-bits added to the user data stream within the transmitter 10 by bit stuff module 33 as previously described. Removal of the stuff-bits returns the user data stream to the form as originally input to transmitter 10 via data input line 36.

Note that codewords of all types, voice, data, and signalling, will appear at the input of bit de-stuff module 230 via post-line bus 208. However, only data codewords will be read into bit de-stuff module 230. This is controlled by timeslot controller 214 via line 218, which serves to enable bit de-stuff module 230 to receive a codeword from post-line bus 208 only when a data codeword is contained thereon, and to disable the input of bit de-stuff module 230 otherwise.

Bit de-stuff module 230 outputs de-stuffed data codewords to output buffer 232 via bus 228. When a valid de-stuffed data codeword has been placed on bus 228, bit de-stuff module 230 signals this condition to data output controller 234 via line 235, causing data output controller 234 to operate the output buffer 232 as described below. Output buffer 232 comprises a first-in, first-out (FIFO) memory whose purpose and function is analogous to input buffer 32, namely, to smooth out short-term variations in the rate of transmission of data codewords within the system, allowing data output line 236 to operate at a constant rate. The operation of output buffer 232 is controlled by data output controller 234 via line 237. The data output controller 24 performs the writing of de-stuffed data codewords appearing on bus 228 into specific memory locations of output buffer 232 and the reading of data codewords from specific memory locations of output buffer 232 onto data output line 236 to effect FIFO operation while providing other control functions necessary to effect FIFO operation of output buffer 232 and while sending and receiving such other control signals via data control line 241 as may be needed to coordinate operation with specific end user data equipment. An example of a control signal would be a clock input or output signal to synchronize the rate at which data codewords are read out of output buffer 232 with the rate of operation of end user data equipment attached to data output line 236.

Turning now to voice output module 202, post-line bus 208 connects to a silence switch 222. A second input to the silence switch 222 is a silence word generator 223, whose purpose is to generate a sequence of digital "silence" codewords whose value corresponds to the zero-voltage level when converted to analog form using North American standard mu-law coding. Such a sequence of digital codewords will yield an interval of silence when converted to analog form within an audio channel. The third input to silence switch 222 is control line 224, which permits timeslot controller 214 to control the state of silence switch 222, selecting either a codeword from post-line bus 208 or a silence codeword from silence word generator 223. The selected codeword is communicated via line 224 to demultiplexer 240, whose purpose is to transfer the codeword to the proper voice channel output 246. Timeslot controller 214, via line 238, synchronizes demultiplexer 240 with the frame structure employed on transmission line 30 to ensure that voice codewords are delivered to the proper voice channel output 246.

The functioning of voice output module 202 is as follows. When a valid voice codeword is present on post-line bus 208, timeslot controller 214 causes silence switch 222 to transfer the voice codeword to line 224 at its output, and then to demultiplexer 240. However, when a data codeword is present on line bus 208, timeslot controller 214 causes silence switch 222 instead to select as input silence word generator 223, causing the silence codeword to be transferred to line 224 at its output. This has the effect of creating silence in the corresponding voice channel during those timeslots which did not otherwise contain valid voice codewords, i.e., during those timeslots which contained data codewords. In this way, the end user listening to the voice channel via one of the voice channel outputs 246 is prevented from perceiving the occasional presence of data codewords within the voice channel.

As noted previously, per-circuit voice signalling bits are communicated from receiver line interface 206 via line 207 to per-circuit latched signalling demultiplexer 220 within voice output module 202. The functioning of per-circuit latched signalling demultiplexer is as follows. In accordance with the North American standard T1 format, valid per-circuit voice signalling bits will be present on line 207 for each channel assigned to carry voice codewords during every sixth frame of the superframe in the T1 signal. Within every sixth frame, the per-circuit voice signalling bits are time-multiplexed, in sequence, on line 207 in synchrony with the appearance of codewords for the corresponding channel on post-line bus 208. Per-circuit latched signalling demultiplexer 220 has the purpose of distributing these time-multiplexed bits to the proper per-circuit signalling output port 247, 247', etc. The demultiplexing function of per-circuit latched signalling demultiplexer 220 is controlled by timeslot controller 214 via line 238, in parallel with and in similar fashion to the control of demultiplexer 240.

During the transmission of frames other than every sixth frame, and for channels assigned to carry data codewords, valid per-circuit signalling bits will be absent from line 207. However, it is generally necessary for the proper operation of end-user terminal or switching equipment connected to per-circuit signalling output ports 47, 247', etc., that the appearance of per-circuit signalling bits be continuous. Consequently, each output of per-circuit latched signalling demultiplexer 220 is latched. The contents of each latched output are updated when, and only when, line 207 contains valid per-circuit signalling bits. The enabling of each latch to accept and hold updated per-circuit signalling bits is controlled by timeslot controller 214 via line 239.

THEORY OF OPERATION

Figures 3A, 3B:
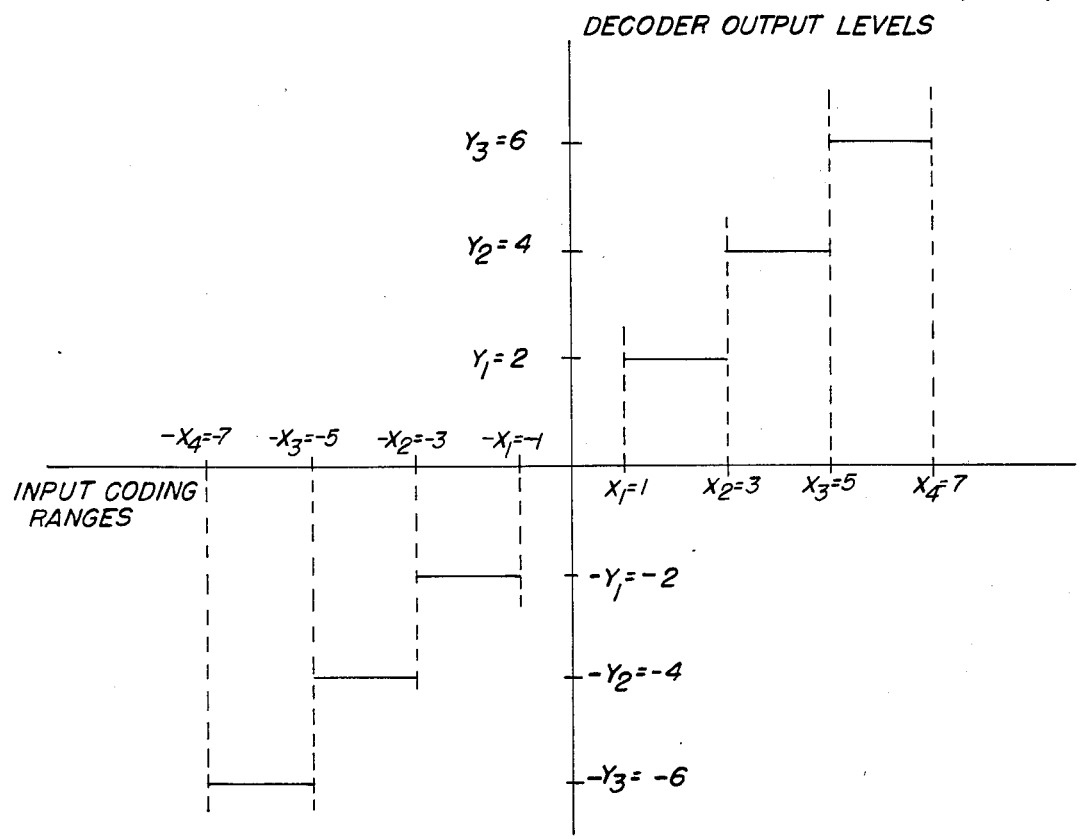
FIGS. 3(A) and 3(B) are graphic and tabular representations of the transfer characteristics for the mu-law companding scheme utilized in the preferred embodiment of FIGS. 1 and 2.

In operation, digitalized voice is input to multiplexer 16 via voice circuit inputs 14. Each voice circuit input 14 serves as input for one digitalized voice circuit. This invention envisages that conversion of analog voice inputs to digital form will be performed using a mid-tread companding scheme. Typical of this class of scheme is mu-law companding, as is commonly used in North America and Japan. The transfer characteristic for mu-law companding is shown in FIG. 3. Note that the compander output for near-zero input signal levels is composed of two colinear horizontal line segments between points $(-1,0)$ and $(0,0)$ and points $(0,0)$ and respectively, $(0,1)$, which together straddle the zero input level $X_0$. This feature is important to the operation of this preferred embodiment, as will be explained below.

In the preferred embodiment, which would be compatible with current telephony practice, each voice circuit input 14 contains a sequence of 8-bit voice codewords, repeated 8000 times per second, which sequence forms the digital representation of the analog voice signal present on the voice circuit. Any number of digitalized voice circuit inputs 14 may be connected to multiplexer 16, but in common practice and in the preferred embodiment twenty-four such voice circuit inputs 14 would be employed, corresponding to the number of voice circuits in North American standard D4 format, as would be employed on a T1 transmission circuit. It must be emphasized that the number of circuits and codeword repetition rate may be varied as such numbers are representative and are not crucial to the operation of the present invention and are provided for example only.

Figure 4:
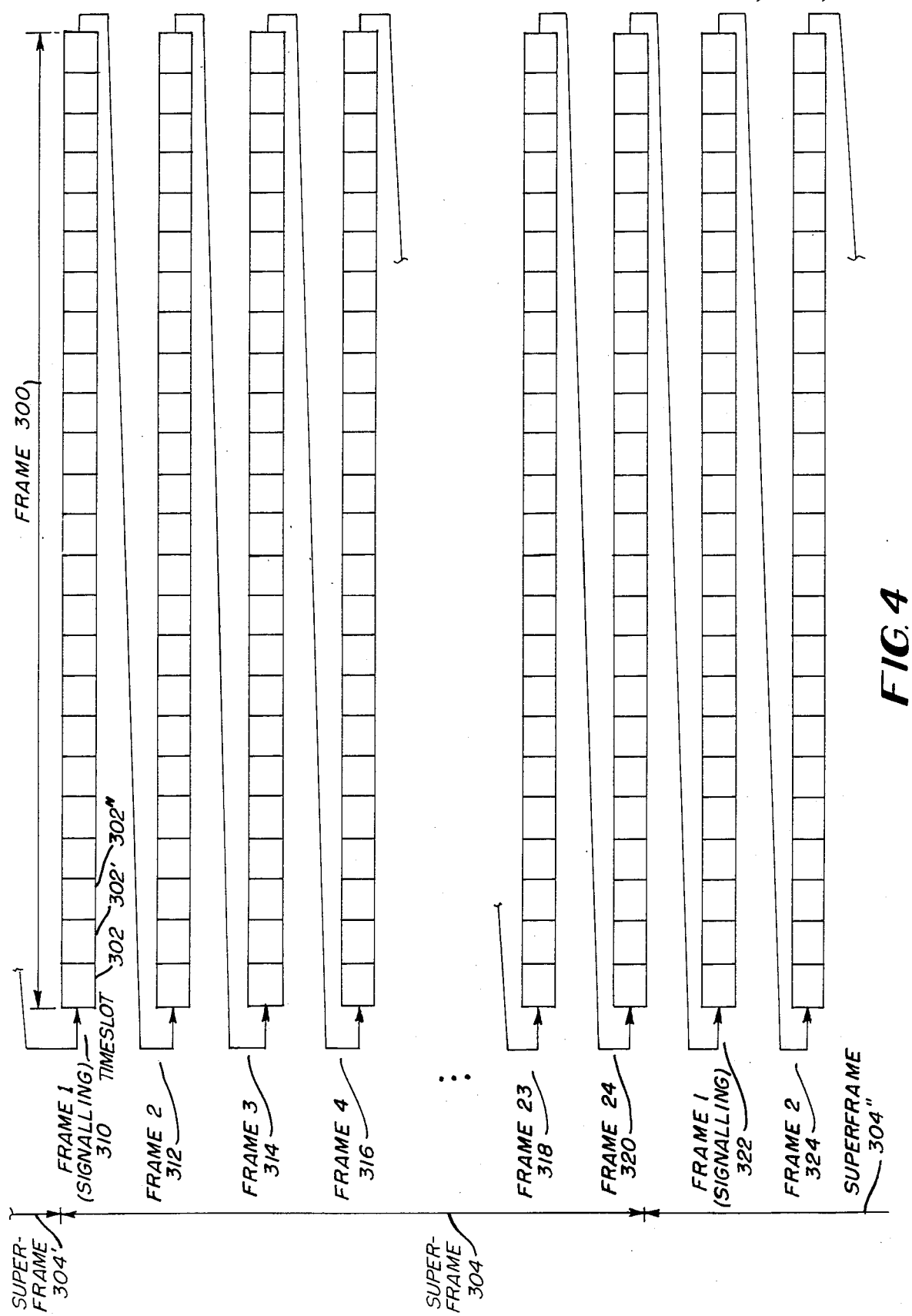
FIG. 4 illustrates the arrangement of Codewords into frames and superframes utilized in the preferred embodiment of FIGS. 1 and 2 and depicts the format on voice bus 20.

Multiplexer 16 sequentially samples each voice circuit input 14 and places the corresponding voice codeword onto voice bus 20. FIG. 4 depicts the format of signals on voice bus 20. Since the voice codeword of each voice circuit input 14 changes 8000 times per second, multiplexer 16 samples all voice circuit inputs 14 once in 125 microseconds. Each interval of 125 microseconds defines one frame 300, which is further subdivided into timeslots 302, 302', 302'', etc. Each timeslot 302 contains the voice codeword from one digitalized voice circuit port 14 and there is one timeslot 302 in each frame 300 for each voice circuit input 14. Note that voice codewords for any given voice circuit input 14 always appears within the same relative timeslot within different frames 310, 312, 314, etc. Thus, a single voice circuit would occupy a set of vertically arranged timeslots in FIG. 4.

As shown in FIG. 4, groups of contiguous frames 300 comprise a superframe 304. In this preferred embodiment, each superframe 304 would contain twenty-four frames 300. This number corresponds with the so-called extended-framing format employed on North American standard T1 circuits, standard telephony practice as is known to those skilled in the art, in order to make equipment embodying this invention more compatible with telephony equipment and systems presently in use. It must be realized, however, that this number (i.e., twenty-four frames per superframe) is not crucial to the functioning of the invention and may be varied while still providing similar operation and benefits.

Figure 5:
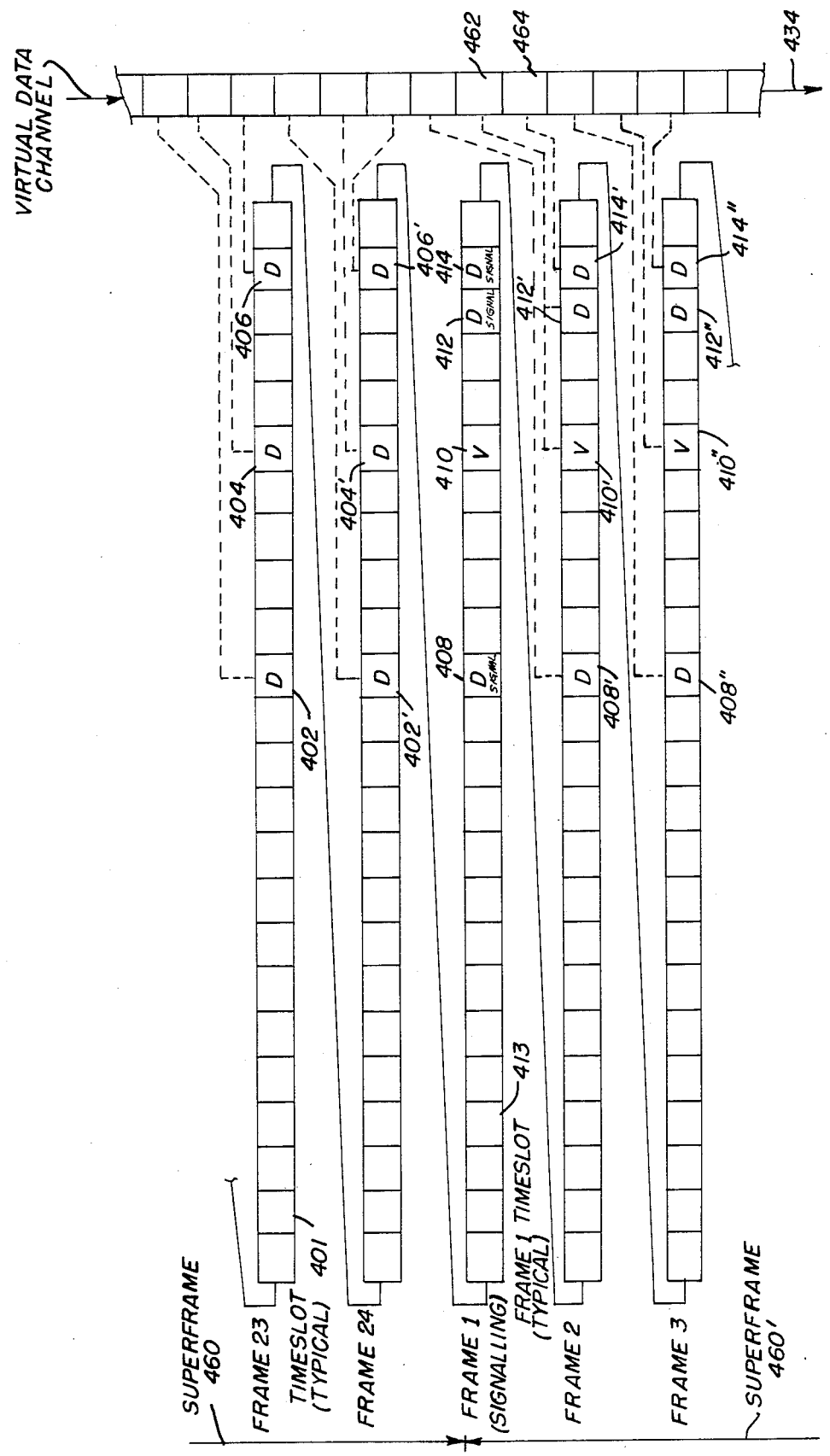
FIG. 5 illustrates the arrangement of codewords as they appear on pre-line bus 42 within the transmitter of FIG. 1 and the post-line bus 208 within the receiver of FIG. 2.

As noted, FIG. 4 depicts the format of signals on voice bus 20. FIG. 5 depicts the format of signals on pre-line bus 42 within transmitter 10 and on post-line bus 208 within receiver 200. The general structure of the two formats is similar. The important differences are as follows. Within FIG. 4, a vertical column of timeslots 302 carries only the sequential voice codewords of one voice circuit from a voice circuit input 14. Within FIG. 5, a vertical column of timeslots 401 defines one channel on the pre-line signal appearing on pre-line bus 42. Each such channel is able to carry one voice circuit or may alternatively be assigned to carry data, as will be explained hereinbelow. The time sequencing of the voice bus signal and pre-line signal also is identical, as will be apparent from FIG. 1 and the operation of timeslot switch 22. Specifically, the framing of both signals is synchronized so that the start of frame one on the voice bus signal coincides with the start of frame one in the pre-line signal; and timeslot count, frame count and superframe advances simultaneously in both signals under control of timeslot controller 25.

Turning now to operation of the voice activity monitor 24, time-division multiplexed voice signals in the frame and superframe format described above are input to voice activity monitor 24 via voice bus 20. Voice activity monitor 24 monitors the activity of each conversation carried on each voice circuit and determines whether speech is present in the voice circuit (i.e., the circuit is in an active circuit state) or absent from the voice circuit (i.e., the circuit is in an idle circuit state). This is accomplished as follows. During each frame 300 of superframe 304, voice activity monitor 24 reads the voice codeword for each voice circuit. Taking voice circuit one as an example, voice activity monitor 24 reads each of the twenty-four codewords for this voice circuit, contained within the first timeslot 302 within successive frames 300, in succession during the current superframe 304. For each timeslot 302 corresponding to voice circuit one, voice activity monitor 24 determines whether the absolute value of the voice codeword contained therein exceeds a preset threshold level, which would indicate whether the amplitude of the voice signal encoded by this voice codeword is above a threshold amplitude. Voice activity monitor 24 records the number of instances during the current superframe 304 in which the threshold was exceeded on this voice circuit, and if this number is greater than a preset number, voice activity monitor 24 determines that the voice circuit was in the active circuit state (i.e., contained a voice signal) during the superframe 304 just past. Conversely, if the number of instances during the current superframe 304 in which the threshold was exceeded is not greater than the preset number, voice activity monitor 24 determines that the voice circuit was in the idle circuit state.

The foregoing explains the operation of voice activity monitor 24 for one voice circuit. Simultaneously and in similar fashion, voice activity monitor 24 monitors each of the remaining twenty-three voice circuits, independently of each other but in parallel, so that a comprehensive mapping of the voice activity in all voice circuits is obtained.

Turning now to FIG. 5, based on the mapping, voice activity monitor 24 assigns the timeslots 401 of each channel in the pre-line signal to carry either the voice codewords of the corresponding voice circuit on voice bus 20 (if the circuit was in the active circuit state) or to carry data codewords from data input module 8 (if the voice circuit was in the idle circuit state) during the next superframe 400'. The mapping is communicated to timeslot controller 25 via line 27 and is used to control the operation of timeslot switch 22 so that either voice codewords from voice bus 20 or data codewords from data bus 40 are selected and routed to line bus 42 during the proper timeslots 401. Furthermore, the mapping is communicated to receiver 200, using a signalling method described below, to allow the receiver 200 to properly separate voice codewords from data codewords within the incoming superframe 400.

It should be noted that voice activity monitor 24 monitors and records voice channel activity within each superframe 304 of the voice bus signal without imposing a delay upon the voice codewords, that is, without interfering with the real-time transmission of voice through the system. The operation of this feature is evident from FIG. 1. During each timeslot 302, a voice codeword appears on voice bus 20 and is thereby communicated simultaneously both to voice activity monitor 24 and to timeslot switch 22, which (if so configured by timeslot controller 25) passes the voice codeword without buffering or delay to pre-line bus 42 and to transmitter line interface 28. Therefore, voice activity monitor 24 monitors each voice codeword, thus monitoring the entire superframe 304, at essentially the same instant that the voice codewords and superframe 304 are being communicated to the receiver 200.

The effect of this operation is that the circuit states determined during any superframe 304 represent the recent history of voice activity, but not necessarily the circuit states which will occur during the next superframe 304. For example, during one superframe 304, a voice circuit may be in the idle circuit state, so that the timeslots 401 for the corresponding channel in the pre-line signal are assigned to carry data codewords during the subsequent superframe 400'. During that subsequent superframe 400', the voice circuit may enter the active circuit state, (i.e., the voice conversation may resume). Because the assignment of pre-line channel timeslots 401 to carry either voice or data codewords occurs only once per superframe 400, 400', etc. at the start of the superframe 400, 400', etc., some number of voice codewords will be prevented from being carried to receiver 200. This occurs because the pre-line timeslots 401 corresponding to that voice circuit, once assigned to carry data codewords, are used to carry data codewords throughout the entire superframe 400, and cannot be reassigned to carry voice codewords until the start of the next superframe 400. This assignment is made by using an all ones codeword as the first codeword of a timeslot to signal that the remaining codewords of that timeslot contain data.

The effect of this will be that a small amount of the voice signal will be clipped immediately following the transition from the idle circuit state to the active circuit state. The amount of clipping is determined by the length of the superframe 304 and 400. For the system exemplified herein, with twenty-four channels per frame and twenty-four frames per superframe, the maximum amount of clipping is 3 milliseconds (since each frame is of 125 microseconds duration). This occurs only when the circuit state transition occurs immediately following the start of a superframe 400. The average clip length is half of this, or 1.5 milliseconds. It has been well demonstrated by both research and telephony practice that speech clipping of this duration is not perceptible to the human ear, so no loss of speech quality will be detected.

The signalling method used to communicate to the receiver 200 the assignment of timeslots to carry either voice or data codewords is an important aspect of this invention. As previously described, during each superframe 304 voice activity monitor 24 determines the circuit state for each voice circuit and assigns each timeslot 401 of the pre-line signal to carry either voice codewords or data codewords during all frames of the next superframe 400'. The assigned state of each channel in the pre-line signal is communicated during frame one of the next superframe in the following way. If the timeslots of a particular channel in the pre-line signal are to carry voice codewords during a superframe 400', one or more zeros will appear within the voice codeword carried in the frame one timeslot 413 for that channel, and the voice codeword carried in the frame one timeslot 413 for that channel will constitute a valid voice codeword, which receiver 200 will deliver to the proper voice circuit output 246. If the codeword in the frame one timeslot 413 contains "ones" in all eight bit-positions, then the remaining timeslots for that channel in the superframe 400' contain data codewords, but the codeword in the frame one timeslot 413 is an invalid data codeword and is discarded by receiver 200. In this way, a channel which is assigned to carry voice in a given superframe 400' will contain valid voice codewords in all timeslots of that superframe 400', so that there is no loss of bits available to carry voice information due to the signalling scheme. A channel which is assigned to carry data in a given superframe 400' will contain valid data codewords in all timeslots 414', 414", etc., in the superframe 400', except for the timeslot 414 for that channel in frame one. The signalling generator 23 is used in this frame one timeslot to either pass along voice codeword or a data signalling codeword formed of all ones.

The benefits of this approach in allowing signalling information to be communicated without degrading the quality of speech will be apparent from FIG. 3. Consider the case where a given voice circuit is in the active circuit state, so that the corresponding frame one timeslot must contain a "zero" in at least one bit position in the codeword. Notice that the North American standard for PCM encoding of voice contains 256 possible codewords, of which all but one contain zeros in at least one bit position. Therefore, most of the time the actual voice codeword in the corresponding frame one timeslot will naturally be of the proper form for signalling to the receiver 200, i.e., will naturally contain at least one "zero" bit. It will occasionally happen, however, that the voice codeword consisting of all "ones" will occur in the frame one timeslot. If this voice codeword were allowed to be sent to the receiver 200 in the first timeslot, it would falsely signal that the channel in which this all "ones" voice codeword occurs contains data codewords during this superframe. This is prevented by this invention by the signalling generator's 23 insertion of a "zero" in bit position one of the voice codeword whenever the all-ones voice codeword appears in a frame one timeslot. This operation does not cause any degradation in the voice quality, even though the voice codeword has been modified, because of a special characteristic of the North American PCM coding scheme. Specifically, in order to make this code of the mid-tread type, the PCM coding scheme contains two colinear segments symmetrically arranged around the zero level. This can be seen in FIG. 3, where input voice signals falling within coding ranges (0, 1) and (−1, 0) produce two different PCM voice codewords, but both of which in turn produce zero volt signals at the decoder output. This invention uses this element of redundancy built into the coding scheme to provide signalling within the stream of voice codewords without sacrificing the quality of voice signals carried by the channels.

In the case where a voice circuit is in the idle circuit state, an all "ones" signalling codeword is developed by the signalling generator 23 and transmitted in the corresponding frame one timeslot. Upon receiving this codeword, the signalling detector 212 causes the codeword to be discarded, but commences to treat the codewords within the timeslots of this channel as data codewords during the remainder of the superframe. In particular, receipt of this codeword is communicated to timeslot controller 214, which controls the delivery of codewords received during all subsequent timeslots of the superframe to either voice output module 202 or data output module 204.

When any timeslot contains either a data codeword or the all "ones" signalling codeword, these codewords must be prevented from entering demultiplexer 240 within voice output module 202, since this would cause a random digitalized audio signal to appear at digitalized voice circuit ports 246 during intervals when the voice circuit should be quiet. To prevent this, a silence switch 222 is inserted between post-line bus 208 and demultiplexer 240 and is controlled by the timeslot controller 214. During superframes in which a particular voice circuit is in the idle circuit state, so that the corresponding channel of the post-line signal contains data codewords or the all-"ones" signalling codeword, the silence switch 222 delivers silence codewords from silence word generator 223 instead of the data codewords on post-line bus 208 during the appropriate timeslots of the superframe. These silence codewords are chosen to cause a constant zero or low-level background noise signal to be delivered to the appropriate voice circuit output 246 in lieu of the data or signalling codewords which were carried within the timeslots of the superframe on the post-line signal. In effect, this operation causes receiver 200 to substitute a locally-created replica of the silent interval which was removed by transmitter 10 in the course of transmitting data or signalling codewords.

It will be apparent from the above description and from FIG. 5 that timeslots may be assigned for the transmission of data codewords without regard to the location of the timeslots relative to the boundaries of the channelization structure. More particularly, it is inherent in this invention to provide a virtual data channel composed of timeslots assigned to carry data codewords, in the natural time sequence in which the timeslots occur, without regard to the channel number in which the timeslot occurs. It should be noted that the virtual data channel may be further subdivided to form multiple low-speed data circuits, which may be more convenient for particular uses of this invention, by the application of standard data multiplexing techniques known to those skilled in the art. This would comprise the use of an external data multiplexer connected to data input line 36, and a corresponding data demultiplexer connected to data output line 236.

The derivation of the virtual data channel as it pertains to the timeslot, frame and superframe structure is illustrated in FIG. 5. Note that timeslots 402 and 2' (which would correspond to channel 14), timeslots 404 and 404' (which would correspond to channel 19), and timeslots 406 and 406' (which would correspond to channel 23) are assigned to carry data codewords during the first superframe 400. During the second superframe 400', the circuit states have changed, so that timeslots 410, 410' and 410" (corresponding to channel 19) are now assigned to carry voice codewords, while timeslots 412, 412' and 412" (which would correspond to channel 22) are now assigned to carry data codewords. Thus, the virtual data channel is composed of timeslots carrying data codewords which are interleaved among timeslots carrying voice codewords within the normal frame and superframe structure.

It will be apparent from FIG. 5 that timeslots which are available to carry data codewords occur at irregular intervals. Note also that the number of timeslots assigned to carry data codewords may vary from superframe to superframe. In particular, it will at times occur that the number of timeslots available to carry data during a given superframe will be insufficient to carry the volume of data codewords arriving on data input line 36, which arrive at a constant rate, and which data codewords are to be carried on the virtual data channel. To prevent the loss of data when this happens, buffer 32 (FIG. 1) and buffer 232 (FIG. 2) are included in the invention to average out these short-term fluctuations in the number of timeslots available to carry data codewords. Buffers 32 and 232 thus have the effect of smoothing out the time-varying data-carrying capacity of the virtual data channel so that the apparent speed of the virtual data channel, as seen from data ports 36 and 236, is constant.

It is a characteristic of certain types of high-speed digital transmission systems that a minimum density of "ones" must be present in the digital bit stream which appears on transmission line 30. This is required in order to allow repeaters, which in common practice would be placed at intervals along transmission line 30 to increase the separation between transmitter 10 and receiver 200, to achieve synchronization with the transmitter 10. This is further required to achieve the similar synchronization of receiver 200 with transmitter 10. As an example, North American standard T1 transmission systems at present require the long-term average density of "ones" in the digital bit stream to be no less than 12.5 percent, i.e., at least one bit in eight on the average must be a "one". Furthermore, regardless of the average density, there may be no more than fifteen consecutive "zeros" anywhere in the digital bit stream.

This "ones" density requirement is met in systems which carry only voice by the particular structure of the PCM voice encoding scheme. In particular, as can be seen in FIG. 3, each voice codeword always contains at least one "one" somewhere within the eight-bit codeword, so the density and consecutiveness requirements are met. However, as can be appreciated from FIG. 5, when the system is used for the transmission of arbitrary sequences of data codewords, it is possible for extended sequences of "zeros" to be transmitted. For example, if the virtual data channel were to contain two consecutive data codewords 462 and 464 each having the value "zero", and if these happened to be transmitted in timeslots 412' and 14', then at least sixteen consecutive "zero" bits would be present in the digital bit stream appearing on transmission line 30, in violation of the consecutiveness requirement.

Figure 6:
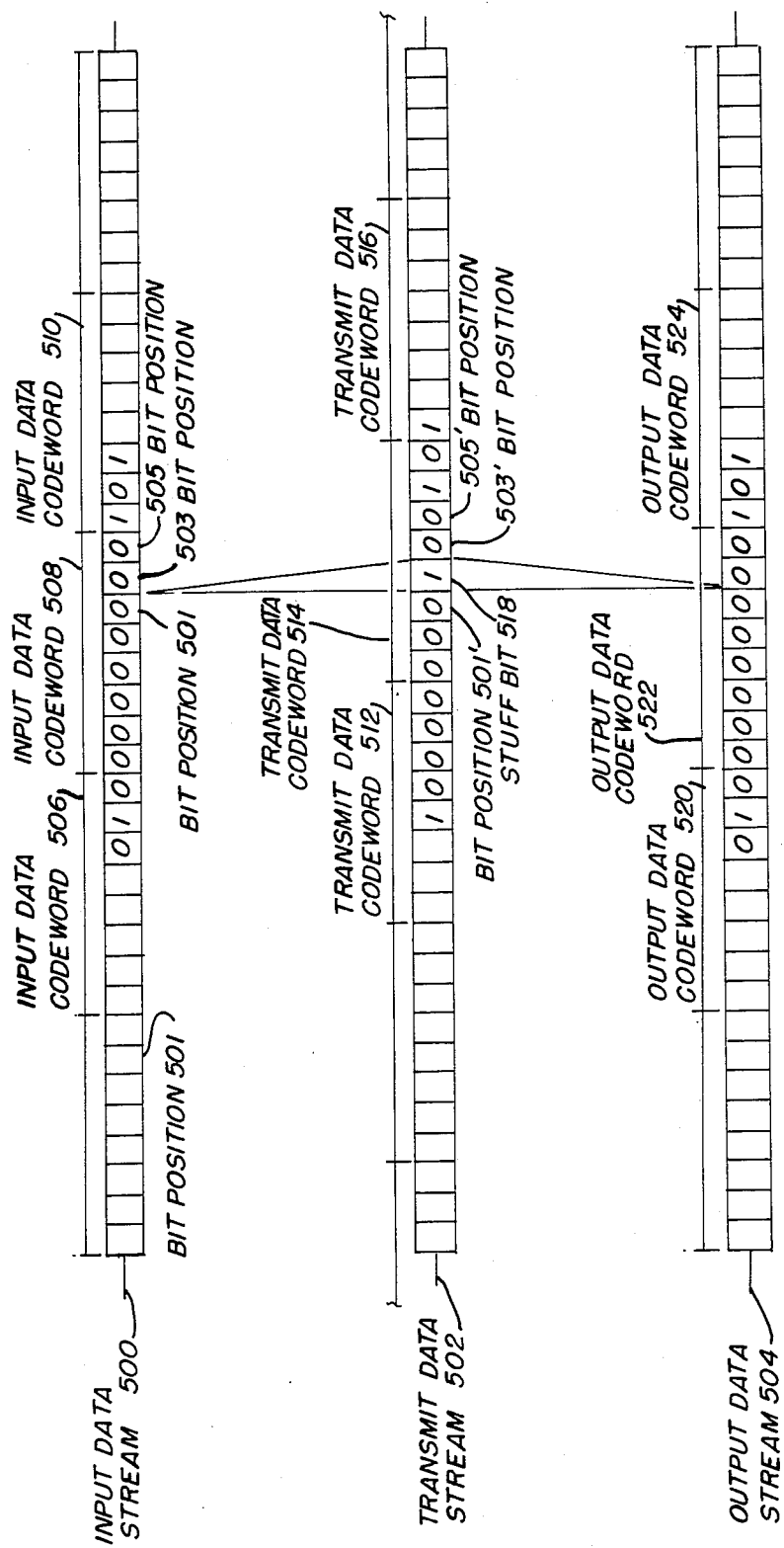
FIG. 6 is a representation of the digital transmission developed according to the teachings of the present invention and illustrates the bit-stuffing techniques which are utilized in the preferred embodiment of the present invention.

The present invention prevents this situation, and meets the minimum "ones" density requirement, through the use of bit-stuffing in the virtual data channel. The principles of operation are illustrated in FIG. 6 and are as follows. Within the data input module 8, bit stuff module 33 monitors the input data stream 500 coming from input buffer 32 via line 39, and generates transmit data stream 502 at its output, which is connected to data bus 40. In operation, bit stuff module 33 maintains a running count of the number of consecutive "zero" bits which have occurred in the input data stream 500 since the occurrence of the last "one" bit. More explicitly, the count of consecutive "zero" bits is reset to zero whenever a "one" bit occurs in the input data stream 500, and is incremented by one each time a "zero" bit occurs therein. When the count equals a preset value N, signifying that a sequence of "zero" bits has occurred, the bit-stuffing procedure is executed in which the input data stream 500 is momentarily interrupted while a "one" bit is inserted into the transmit data stream 502 immediately following the Nth "zero" bit, as detailed below. This guarantees that there will be no more than N consecutive "zero" bits in the transmit data stream 502, and that the average "ones" density will equal or exceed $1/(N+1)$. Note that for North American standard T1 transmission systems, N must be set at seven or less, for reasons which will become apparent. For other transmission systems with differing density and consecutiveness requirements, N will take on other values.

Referring now to FIG. 6, an arbitrary input data stream 500, which is a copy of the user data stream input on line 36 delayed by a randomly varying time interval due to the buffering action of input buffer 32, enters bit stuff module 33 via line 39. Input data stream 500 may from time to time contain a sequence of consecutive "zero" bits of length N. Such a sequence is typified by the sequence of "zero" bits occurring between input data codeword 506 and input data codeword 510. For a North American standard T1 system, with N=7, after the seventh consecutive "zero" bit occurs at bit position 501, bit stuff module 33 momentarily interrupts input data stream 500 and inserts a stuff bit 518 into the transmit data stream 502 between bit position 501' and bit position 503'. It should be noted that because transmit data stream 502 contains more bits than the original input data stream 500, an input data codeword 508 no longer will necessarily exactly fill a transmit data codeword 514, so that each transmit data codeword may contain portions of two input data codewords.

Note further that the addition of stuff bits to the input data stream 500 causes the transmit data stream 502 to gradually fall behind input data stream 500. That is, an input data codeword 508 is sent from input buffer 32 to bit stuff module 33 eight bits at a time, which is common practice in memory circuits of the type employed in input buffer 32. Similarly, a complete transmit data codeword 514 comprising eight data bits, is sent over data bus 40 to timeslot switch 22. Whenever bit stuff module 33 inserts a stuff bit 518 in transmit data stream 502, at most only seven bits of the input data codeword 508 can be contained in transmit data codeword 514, since one bit position of transmit data codeword 514 is now occupied by stuff bit 518. Bit stuff module 33 retains the unsent data bit from bit position 505 of input data codeword 508 in order to send it in the first bit position 506 of the next transmit data codeword 516, causing the transmit data codewords to slip by one bit position out of coincidence with the input data codewords. The remaining seven bit positions of transmit data codeword 516 are filled with the first seven bits of input data codeword 510, and the process repeats. Eventually, other stuff bits will be required so that transmit data stream 502 will increasingly slip out of coincidence with input data stream 500. Since each bit slip which thus accumulates requires one bit of temporary storage in bit stuff module 33, the number of slipped bits which can accumulate must be limited. This is accomplished as follows. When eight slipped bits accumulate in bit stuff module 33, an inhibit signal is sent to data input controller 34 via line 41 which in turn prevents input buffer 32 from sending an input data codeword to bit stuff module 33 as it normally would. In its place, bit stuff module 33 sends the eight slipped bits, bringing it back into coincidence with input buffer 32. Following this procedure, normal operation resumes until eight slipped bits again accumulate.

At the receiver 200, the reverse process occurs to remove stuff bit 518 from the transmit data stream 502 which is received from transmission line 30 via post-line bus 208. The output data stream 504, which is sent to data output line 236 via output buffer 232, is thereby restored to a form which is identical to the original input data stream 500. In operation, bit de-stuff module 230 monitors the transmit data stream 502 arriving via line bus 208, and counts the number of consecutive "zero" bits which occur. When N consecutive "zero" bits are detected, bit de-stuff module 230 deletes the next bit from the data stream, since this will be the stuff bit 518 which was added by bit stuff module 33.

The bit-stuffing technique described above may be implemented directly in circuitry or software comprising the bit stuff module 33 and bit de-stuff module 230, as described. An alternative embodiment of the above technique is possible which may sometimes present economic advantages over direct implementation. Specifically, the alternative embodiment makes use of features of standard data communications protocols which have been widely implemented as standard VLSI integrated circuits, which can be readily and economically incorporated into practical systems based on this invention. This alternative embodiment comprises the use of a standard communications protocols of the type known as bit-oriented protocols, which are well-known to those skilled in the art. These protocols are typified by the High-Level Data Link Control protocol, also known as HDLC, as promulgated by the International Standards Organization.

The method of employing a bit-oriented protocol within this invention is as follows. It is a feature of these protocols that a control character known as a "flag", consisting of a sequence of six consecutive "ones" preceded by a "zero" and followed by a "zero" (i.e., the pattern 01111110), may from time to time be inserted into a user data stream for the purpose of communicating certain control information from the transmitter to the receiver. The details of this operation are well known to those skilled in the art, and need not be elaborated further here. What is important to the present invention is that a sequence of six consecutive "ones" will be prevented from accidentally occurring in the transmit data stream in order to prevent the receiver from falsely interpreting this accidental pattern in the transmit data stream as a control character sent by the transmitter. This is accomplished using a bit-stuffing technique in which the transmitter detects the presence of five consecutive "ones" in the input data stream and inserts a "zero" stuff-bit in the next bit position. The receiver performs the reverse process by first detecting and removing legitimate "flag" characters, then detecting the presence of five consecutive "ones" in the transmit data stream and deleting the "zero" which will be present in the next bit position. In this way, the output data stream from the receiver will be made identical to the input data stream which was originally input at the transmitter.

Figure 8A:
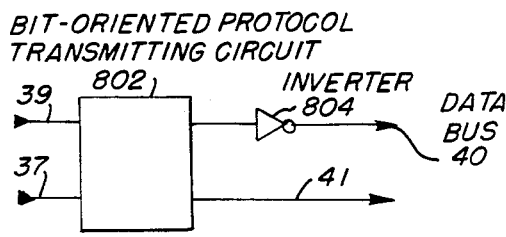
FIG. 8(a) and 8(b) are block diagrams illustrating the modified bit oriented protocol transmitting and receiving circuits respectively, which is substituted for the bit stuff module 33 of FIG. 1 and bit de-stuff module 230 of FIG. 2 in an alternative embodiment of the present invention.
Figure 8B:
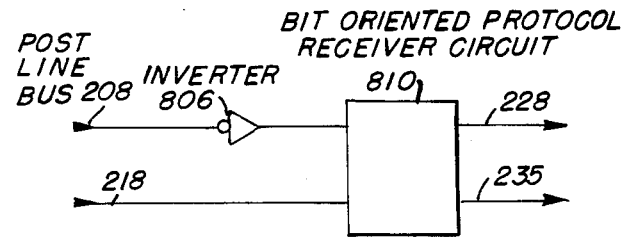

The alternative embodiment therefore includes a bit-oriented protocol transmitting circuit 802 which substitutes for the bit stuff module 33, and a corresponding receiver circuit 810 used in place of the bit de-stuff module 230 as illustrated in FIGS. 8(a) and 8(b), respectively. This arrangement provides operation in accordance with the principles of operation of the general bit-stuffing technique described above, with N=5. The major distinction is that, while the general technique bit-stuffs "ones" to prevent extended sequences of consecutive "zeros", the bit-oriented protocols bit-stuff "zeros" into input data stream 400 to prevent extended sequences of consecutive "ones". The alternative embodiment therefore contains a pair of inverters, a first inverter 804 which follows the bit-oriented protocol transmitting circuit and a second inverter 806 which precedes the bit-oriented protocol receiver circuit, which convert the transmit data stream formatted in accordance with bit-oriented protocol to low-true form, in which logical "zeros" in the data stream are represented by positive electrical voltages, and "ones" are represented by zero or negative electrical voltages. This has the effect of changing the basic bit-oriented protocol so that the transmit data stream 502, as transmitted on transmission line 30, appears to have "ones" bit-stuffed to prevent extended runs of consecutive "zeros". At receiver 200, this process is reversed by the second inverter, which converts the transmit bit stream 502 back into its original high-true form for use by the bit-oriented protocol receiver within data output module 204.

The invention being thus described, it should now be apparent that the preferred embodiment may be easily modified and that all such modifications are within the scope of the present invention which is defined solely by the appended claims.

I claim:

1. A method of transmitting digitalized voice and data over a communications channel as a combined data stream, said digitalized voice being formed by digitalizing a voice signal using an encoding protocol wherein various amplitude levels of said voice signal are each represented as an individual bit code, at least a first amplitude level being represented by at least first and second redundant said bit codes, said digitalized voice being transmitted over said communications channel in substantially real time, comprising:

substituting said second redundant bit code for said first redundant bit code when said first redundant code is detected in said digitalized voice;
monitoring said voice signal to detect the absence of any substantial voice communication;
inserting said first redundant code in said data stream to signal the beginning of data transmission when no substantial voice communication is detected by said step of monitoring;
inserting data into said combined data stream for a period of time after said first redundant code; and
transmitting said data stream including said digitalized data over said communications channel.

2. The method of claim 1 further comprising arranging individual bit codes associated with a single voice channel into a code group;
said step of inserting said first redundant code in said data stream inserting said first redundant code as the first bit code of a said code group:
said step of transmitting said data stream transmitting said data during the remainder of said code group into which said first redundant code is inserted.

3. The method of claim 2 wherein said communication channel has predefined bit density requirements for a signal sent over said channel, said bit density requirements being satisfied by ensuring that said signal will have no more than N consecutive digital zeros in said signal before a digital one is encountered, where N is an integer, said method further comprising:
monitoring said digitalized data to be transmitted over said channel;
determining when the number of consecutive zeros is equal to said number N; and
inserting a digital one into said digitalized data when said step of determining determines that said number of consecutive zeros equals N.

4. The method of claim 2 wherein a receiver is provided downstream of said communication channel, said receiver:
receiving said combined data stream from said communications channel;
monitoring the first individual bit code of each said code group;
determining if said first individual bit code is said first redundant bit code, said individual bit codes of said code group being digitalized voice if said first individual bit code is not said first redundant bit code, said individual bit codes of said code group being digitalized data if said first individual bit code is said first redundant code.

5. The method of claim 4 wherein all of said code group contains digitalized voice when said first individual bit code is not said first redundant code.

6. The method of claim 4 wherein all of said code groups except said first individual bit code is data when said first individual bit code is said first redundant code.

7. The method of claim 2 further comprising: time division multiplexing a plurality of voice channels into a single signal to be transmitted over said communication channel by:
assembling said individual code word from each said voice channel into a frame having a plurality of individual code words each associated with a single channel;
assembling a plurality of said frames into a superframe, the individual code words from each said voice channel collectively forming a said code group within said channel.

8. The method of claim 4 further comprising: time division multiplexing a plurality of voice channels into a single signal to be transmitted over said communication channel by:
assembling said individual code word from each said voice channel into a frame having a plurality of individual code words each associated with a single channel;
assembling a plurality of said frames into a superframe, the individual code words from each said voice channel collectively forming a said code group within said channel.

9. A method of transmitting data during idle intervals of voice conversation transmitted over a communication channel in real time comprising:
transmitting said voice conversation with interleaved data by,
developing a plurality of pulse code modulated voice codewords which encode said voice conversation,
assembling said voice codewords into code groups, each code group including a predetermined number of said codewords,
monitoring voice activity of said voice conversation by monitoring said voice codewords of a said code group to identify idle frames containing voice codewords which encode said conversation but have no significant voice activity, p2 replacing, upon detection of an idle frame, the first voice codeword of a next succeeding code group which encodes said conversation with a data transfer codeword, said data transfer codeword being different from any said voice codeword,
replacing, upon detection of an idle frame, the second and subsequent voice code words of the next succeeding code group with data codewords representing data to be transmitted;
transmitting said code groups on said communication channel; and receiving said voice conversation with interleaved data and removing said data therefrom by,
  monitoring each said code groups received from said communication channel,
  examining the first said codeword of each said code group to determine if the first said codeword of each said transmitted code group is a data transfer codeword; to identify the remaining codewords of said code group as data codewords,
  converting all said codewords within said code group to an analog voice signal to complete transmission of said voice conversation when said first codeword is not a said data transfer codeword, and
  supplying the second and subsequent codewords within said code group, when said first codeword is a data transfer codeword, as a digital data string.

10. A system of transmitting digitalized voice and data over a communications channel as a combined data stream, said digitalized voice being formed by digitalizing a voice signal using an encoding protocol wherein various amplitude levels of said voice signal are each represented as an individual bit code, at least a first amplitude level being represented by at least first and second redundant bit codes, comprising:
  first input means for providing said digitalized voice signal;
  second input means for providing said data;
  voice activity monitor means, responsive to said first input means, for detecting idle periods in said digitalized voice signal and for producing an idle output representative thereof;
  signalling generator means, operatively connected to said first input means, for substituting, during at least an initial periodic time frame, said second redundant code for said first redundant code in said digitalized voice signal, and for developing said first redundant code as a data start signalling code when data is to be transmitted;
  switch means, operatively connected between said communications channel and said signalling generator means, first input means and second input means, for supplying one of said digitalized voice signal, said data or said data start signalling code to said communications channel; and
  control means, responsive to the output of said voice activity monitor means, for controlling said switch means, said control means connecting said switch means to said first input means to transmit said digitalized voice signal, and connecting said switch means to said second input to supply data to said communications channel, said control means further controlling said signalling generator means and connecting said switch means to said signalling generator means during said periodic time frame;
  said control means reconnecting said switch means to said first input means when an idle period is no longer detected in said digitalized voice.

11. The system of claim 11 wherein said individual bit codes associated with a single voice channel are arranged into a code group, the first individual bit code of each code group occurring during said initial periodic time frame while other individual bit codes of a said code group occur during other periodic time frames,
  said control means connecting said switch means to said signalling generator means during said initial periodic time frame, said control means controlling said signalling generator means to generate said data start signalling code in response to the detection of an idle signal by said voice activity monitor means,
  said control means connecting said switch means to said first input means or said second input means depending on whether an idle period is detected by said voice activity monitor means during the remaining periodic time frames of each said code group.

12. The system of claim 10 wherein said second input means provides said data as a digital data stream and includes,
  bit stuffing means for inserting a one in said digital data stream when the number of consecutive zeros in said data stream is equal to the integer N.

13. The system of claim 11 further comprising means for receiving said combined data stream including,
  means for monitoring the first individual bit codes of each code group to detect a data start signalling code to determine a code group containing data;
  data output means receiving said combined data stream, said data output means being enabled during said code group in response to detection of a data start signalling code by said means for monitoring;
  voice output means receiving said combined data stream, said voice output means including,
  silence word insertion means, for generating a silence word during each periodic time frame to simulate silence on a voice output in response to detection of a data start signalling code by said means for monitoring,
  said voice output means inhibiting output of said combined data stream during receipt of a code group containing data.

* * * * *